US006996750B2

(12) United States Patent
Tetreault

(10) Patent No.: US 6,996,750 B2
(45) Date of Patent: Feb. 7, 2006

(54) METHODS AND APPARATUS FOR COMPUTER BUS ERROR TERMINATION

(75) Inventor: Mark Tetreault, Webster, MA (US)

(73) Assignee: Stratus Technologies Bermuda Ltd., Hamilton (BM)

(*) Notice: Subject to any disclaimer, the term of this patent is extended or adjusted under 35 U.S.C. 154(b) by 461 days.

(21) Appl. No.: 09/871,180

(22) Filed: May 31, 2001

(65) Prior Publication Data

US 2002/0194548 A1 Dec. 19, 2002

(51) Int. Cl.
G06F 11/00 (2006.01)
(52) U.S. Cl. .......................................... 714/44; 714/43
(58) Field of Classification Search ................. 714/44, 714/43
See application file for complete search history.

(56) References Cited

U.S. PATENT DOCUMENTS

| 3,460,094 A | 8/1969 | Pryor et al. ............... 340/172.5 |
| 3,544,973 A | 12/1970 | Borck, Jr. et al. ........ 340/172.5 |
| 3,548,176 A | 12/1970 | Shutler ....................... 235/153 |
| 3,548,382 A | 12/1970 | Lichty et al. ............. 340/172.5 |
| 3,609,704 A | 9/1971 | Shurter ..................... 340/172.5 |
| 3,641,505 A | 2/1972 | Artz et al. ................ 340/172.5 |
| 3,705,388 A | 12/1972 | Nishimoto ................ 340/172.5 |
| 3,710,324 A | 1/1973 | Cohen et al. ............. 340/172.5 |
| 3,736,566 A | 5/1973 | Anderson et al. ........ 340/172.5 |
| 3,795,901 A | 3/1974 | Boehm et al. ............ 340/172.5 |
| 3,805,039 A | 4/1974 | Stiffler ................... 235/153 AE |
| 3,820,079 A | 6/1974 | Bergh et al. .............. 340/172.5 |
| 3,840,861 A | 10/1974 | Amdahl et al. ........... 340/172.5 |
| 3,893,084 A | 7/1975 | Kotok et al. ............. 340/172.5 |
| 3,997,896 A | 12/1976 | Cassarino, Jr. et al. .. 340/172.5 |
| 4,015,246 A | 3/1977 | Hopkins, Jr. et al. .... 340/172.5 |
| 4,032,893 A | 6/1977 | Moran ..................... 340/166 R |
| 4,059,736 A | 11/1977 | Perucca et al. ........ 179/175.2 R |
| 4,164,787 A | 8/1979 | Aranguren ................... 364/200 |
| 4,228,496 A | 10/1980 | Katzman et al. ............ 364/200 |
| 4,245,344 A | 1/1981 | Richter ........................ 371/68 |
| 4,263,649 A | 4/1981 | Lapp, Jr. .................... 364/200 |

(Continued)

FOREIGN PATENT DOCUMENTS

EP 0 301 499 A2 2/1989

(Continued)

OTHER PUBLICATIONS

Foundation models PCI, PCI-X 2.0 Verification solutions datasheet, www.transeda.com, pp. 1-3.*

Primary Examiner—Robert Beausoliel
Assistant Examiner—Michael Maskulinski
(74) Attorney, Agent, or Firm—Kirkpatrick & Lockhart Nicholson Graham LLP

(57) ABSTRACT

In a computer system having a bus architecture, a system and process for isolating a device from a bus without interrupting system operation is described, the system including bus interface logic monitoring and reporting activity on the bus, isolation control logic receiving error signals from error detectors, and isolation switches through which devices are interconnected to the bus, the isolation switches allowing for the isolation of the devices from the bus. The isolation control logic determines the devices to be isolated responsive to the reported error and, in turn, transmits an isolation switch control signal to the isolation switch(es) associated with the identified device(s) to isolate those device(s) from the bus. In some embodiments, errors are reported by system software, input/output virtual address error detectors for systems using virtual memory addressing, protocol error detectors, and sensors sensing the physical removal of a bus-connected device from its bus interface slot.

23 Claims, 4 Drawing Sheets

U.S. PATENT DOCUMENTS

| | | | |
|---|---|---|---|
| 4,275,440 A | 6/1981 | Adams, Jr. et al. | 364/200 |
| 4,309,754 A | 1/1982 | Dinwiddie, Jr. | 364/200 |
| 4,356,550 A | 10/1982 | Katzman et al. | 364/200 |
| 4,365,295 A | 12/1982 | Katzman et al. | 364/200 |
| 4,366,535 A | 12/1982 | Cedolin et al. | 364/200 |
| 4,434,463 A | 2/1984 | Quinquis et al. | 364/200 |
| 4,449,182 A | 5/1984 | Rubinson et al. | 364/200 |
| 4,453,215 A | 6/1984 | Reid | 364/200 |
| 4,466,098 A | 8/1984 | Southard | 371/9 |
| 4,467,436 A | 8/1984 | Chance et al. | 364/513 |
| 4,484,273 A | 11/1984 | Stiffler et al. | 364/200 |
| 4,486,826 A | 12/1984 | Wolff et al. | 364/200 |
| 4,503,496 A | 3/1985 | Holzner et al. | 364/200 |
| 4,543,628 A | 9/1985 | Pomfret | 364/200 |
| 4,590,554 A | 5/1986 | Glazer et al. | 364/200 |
| 4,597,084 A | 6/1986 | Dynneson et al. | 371/51 |
| 4,608,631 A | 8/1986 | Stiffler et al. | 364/200 |
| 4,628,447 A | 12/1986 | Cartret et al. | 364/200 |
| 4,630,193 A | 12/1986 | Kris | 364/200 |
| 4,633,394 A | 12/1986 | Georgiou et al. | 364/200 |
| 4,654,857 A | 3/1987 | Samson et al. | 371/68 |
| 4,669,056 A | 5/1987 | Waldecker et al. | 364/200 |
| 4,669,079 A | 5/1987 | Blum | 370/85 |
| 4,695,975 A | 9/1987 | Bedrij | 364/900 |
| 4,700,292 A | 10/1987 | Campanini | 364/200 |
| 4,700,348 A | 10/1987 | Ise et al. | 371/8 |
| 4,703,420 A | 10/1987 | Irwin | 364/200 |
| 4,716,523 A | 12/1987 | Burrus, Jr. et al. | 364/200 |
| 4,750,177 A | 6/1988 | Hendrie et al. | 371/32 |
| 4,805,091 A | 2/1989 | Thiel et al. | 364/200 |
| 4,809,169 A | 2/1989 | Sfarti et al. | 364/200 |
| 4,816,990 A | 3/1989 | Williams | 364/200 |
| 4,827,409 A | 5/1989 | Dickson | 364/200 |
| 4,835,737 A | 5/1989 | Herrig et al. | 364/900 |
| 4,866,604 A | 9/1989 | Reid | 364/200 |
| 4,914,580 A | 4/1990 | Jensen et al. | 364/200 |
| 4,916,695 A | 4/1990 | Ossfeldt | 371/9.1 |
| 4,924,427 A | 5/1990 | Savage et al. | 364/900 |
| 4,926,315 A | 5/1990 | Long et al. | 364/200 |
| 4,931,922 A | 6/1990 | Baty et al. | 364/200 |
| 4,939,643 A | 7/1990 | Long et al. | 364/200 |
| 4,942,517 A | 7/1990 | Cok | 364/200 |
| 4,942,519 A | 7/1990 | Nakayama | 364/200 |
| 4,965,717 A | 10/1990 | Cutts, Jr. et al. | 364/200 |
| 4,974,144 A | 11/1990 | Long et al. | 364/200 |
| 4,974,150 A | 11/1990 | Long et al. | 364/200 |
| 4,985,830 A | 1/1991 | Atac et al. | 364/200 |
| 4,993,030 A | 2/1991 | Krakauer et al. | 371/40.1 |
| 4,994,960 A | 2/1991 | Tuchler et al. | 364/200 |
| 4,999,787 A | 3/1991 | McNally et al. | 364/514 |
| 5,083,258 A | 1/1992 | Yamasaki | 395/725 |
| 5,115,490 A | 5/1992 | Komuro et al. | 395/400 |
| 5,117,486 A | 5/1992 | Clark et al. | 395/250 |
| 5,138,257 A | 8/1992 | Katsura | 324/158 R |
| 5,175,855 A | 12/1992 | Putnam et al. | 395/700 |
| 5,179,663 A | 1/1993 | Iimura | 395/250 |
| 5,193,162 A | 3/1993 | Bordsen et al. | 395/425 |
| 5,193,180 A | 3/1993 | Hastings | 395/575 |
| 5,195,040 A | 3/1993 | Goldsmith | 364/443 |
| 5,231,640 A | 7/1993 | Hanson et al. | 371/68.3 |
| 5,243,704 A | 9/1993 | Baty et al. | 395/325 |
| 5,247,522 A | 9/1993 | Reiff | 371/29.5 |
| 5,251,303 A | 10/1993 | Fogg, Jr. et al. | 395/275 |
| 5,270,699 A | 12/1993 | Signaigo et al. | 340/825.01 |
| 5,272,584 A | 12/1993 | Austruy et al. | 361/58 |
| 5,276,860 A | 1/1994 | Fortier et al. | 395/575 |
| 5,280,612 A | 1/1994 | Lorie et al. | 395/600 |
| 5,280,619 A | 1/1994 | Wang | 395/725 |
| 5,295,258 A | 3/1994 | Jewett et al. | 395/575 |
| 5,313,627 A | 5/1994 | Amini et al. | 395/575 |
| 5,317,726 A | 5/1994 | Horst | 395/575 |
| 5,321,706 A | 6/1994 | Holm et al. | 371/51.1 |
| 5,335,334 A | 8/1994 | Takahashi et al. | 395/425 |
| 5,357,612 A | 10/1994 | Alaiwan | 395/200 |
| 5,386,524 A | 1/1995 | Lary et al. | 395/400 |
| 5,404,361 A | 4/1995 | Casorso et al. | 371/40.1 |
| 5,418,404 A | 5/1995 | Araoka et al. | 307/142 |
| 5,423,037 A | 6/1995 | Hvasshovd | 395/600 |
| 5,423,046 A | 6/1995 | Nunnelley et al. | 395/750 |
| 5,426,747 A | 6/1995 | Weinreb et al. | 395/400 |
| 5,428,766 A | 6/1995 | Seaman | 395/575 |
| 5,440,727 A | 8/1995 | Bhide et al. | 395/444 |
| 5,440,732 A | 8/1995 | Lomet et al. | 395/600 |
| 5,463,755 A | 10/1995 | Dumarot et al. | 395/475 |
| 5,465,340 A | 11/1995 | Creedon et al. | 395/846 |
| 5,475,860 A | 12/1995 | Ellison et al. | 395/846 |
| 5,497,476 A | 3/1996 | Oldfield et al. | 395/439 |
| 5,504,873 A | 4/1996 | Martin et al. | 395/438 |
| 5,513,314 A | 4/1996 | Kandasamy et al. | 395/182.04 |
| 5,530,302 A | 6/1996 | Hamre et al. | 307/147 |
| 5,537,535 A | 7/1996 | Maruyama et al. | 395/183.01 |
| 5,550,986 A | 8/1996 | DuLac | 395/280 |
| 5,555,372 A | 9/1996 | Tetreault et al. | 395/182.13 |
| 5,555,404 A | 9/1996 | Torbjørnsen et al. | 395/600 |
| 5,557,770 A | 9/1996 | Bhide et al. | 295/488 |
| 5,566,316 A | 10/1996 | Fechner et al. | 395/441 |
| 5,568,629 A | 10/1996 | Gentry et al. | 395/441 |
| 5,572,685 A * | 11/1996 | Fisher et al. | 710/107 |
| 5,574,865 A | 11/1996 | Hashemi | 395/283 |
| 5,584,008 A | 12/1996 | Shimada et al. | 395/441 |
| 5,584,018 A | 12/1996 | Kamiyama | 395/492 |
| 5,584,030 A | 12/1996 | Husak et al. | 395/750 |
| 5,586,253 A | 12/1996 | Green et al. | 395/411 |
| 5,586,310 A | 12/1996 | Sharman | 395/600 |
| 5,600,784 A | 2/1997 | Bissett et al. | 395/182.1 |
| 5,613,162 A | 3/1997 | Kabenjian | 395/842 |
| 5,627,961 A | 5/1997 | Sharman | 395/182.04 |
| 5,627,965 A | 5/1997 | Liddell et al. | 395/185.01 |
| 5,630,056 A | 5/1997 | Horvath et al. | 395/183.19 |
| 5,632,031 A | 5/1997 | Velissaropoulos et al. | 395/611 |
| 5,659,681 A | 8/1997 | Ojima | 395/183.19 |
| 5,664,172 A | 9/1997 | Antoshenkov | 395/604 |
| 5,671,443 A | 9/1997 | Stauffer et al. | 395/845 |
| 5,687,392 A | 11/1997 | Radko | 395/842 |
| 5,696,905 A | 12/1997 | Reimer et al. | 395/227 |
| 5,701,410 A | 12/1997 | BeMent et al. | 395/183.19 |
| 5,701,457 A | 12/1997 | Fujiwara | 395/608 |
| 5,737,601 A | 4/1998 | Jain et al. | 395/617 |
| 5,751,955 A | 5/1998 | Sonnier et al. | 395/200.19 |
| 5,758,065 A | 5/1998 | Reams et al. | 395/185.01 |
| 5,784,576 A * | 7/1998 | Guthrie et al. | 710/302 |
| 5,809,256 A | 9/1998 | Najemy | 395/283 |
| 5,812,748 A | 9/1998 | Ohran et al. | 395/182.02 |
| 5,815,647 A | 9/1998 | Buckland et al. | 395/182.01 |
| 5,815,649 A | 9/1998 | Utter et al. | 395/112.04 |
| 5,828,903 A | 10/1998 | Sethuram et al. | 395/817 |
| 5,838,899 A | 11/1998 | Leavitt et al. | 395/185.09 |
| 5,838,900 A | 11/1998 | Horvath et al. | 395/185.09 |
| 5,838,993 A | 11/1998 | Riley et al. | 395/842 |
| 5,862,145 A | 1/1999 | Grossman et al. | 371/5.1 |
| 5,875,308 A | 2/1999 | Egan et al. | 395/283 |
| 5,875,351 A | 2/1999 | Riley | 395/842 |
| 5,881,251 A | 3/1999 | Fung et al. | 395/283 |
| 5,892,928 A | 4/1999 | Wallach et al. | 395/283 |
| 5,894,560 A | 4/1999 | Carmichael et al. | 395/845 |
| 5,928,339 A | 7/1999 | Nishikawa | 710/26 |
| 5,944,800 A | 8/1999 | Mattheis et al. | 710/23 |
| 5,953,538 A | 9/1999 | Duncan et al. | 395/842 |
| 5,953,742 A | 9/1999 | Williams | 711/154 |
| 5,956,476 A | 9/1999 | Ranson et al. | 395/183.06 |
| 5,956,756 A | 9/1999 | Khalidi et al. | 711/207 |
| 5,978,866 A | 11/1999 | Nain | 710/22 |
| 5,982,672 A | 11/1999 | Moon et al. | 365/189.01 |
| 5,983,289 A | 11/1999 | Ishikawa et al. | 710/35 |

| | | | |
|---|---|---|---|
| 5,991,158 A | 11/1999 | Chan et al. ................. 361/736 |
| 5,991,900 A | 11/1999 | Garnett ........................ 714/56 |
| 5,996,035 A | 11/1999 | Allen et al. ................. 710/103 |
| 6,000,043 A | 12/1999 | Abramson ................... 714/44 |
| 6,009,535 A | 12/1999 | Halligan et al. ................ 714/5 |
| 6,012,106 A | 1/2000 | Schumann et al. ........... 710/22 |
| 6,012,120 A | 1/2000 | Duncan et al. ............. 710/129 |
| 6,021,456 A | 2/2000 | Herdeg et al. .............. 710/260 |
| 6,026,458 A | 2/2000 | Rasums ..................... 710/103 |
| 6,032,271 A | 2/2000 | Goodrum et al. ............ 714/56 |
| 6,041,375 A | 3/2000 | Bass et al. ................. 710/103 |
| 6,047,343 A | 4/2000 | Olarig ....................... 710/102 |
| 6,049,894 A | 4/2000 | Gates .......................... 714/41 |
| 6,055,584 A | 4/2000 | Bridges et al. ............... 710/27 |
| 6,062,480 A | 5/2000 | Evoy .......................... 235/492 |
| 6,073,196 A | 6/2000 | Goodrum et al. ........... 710/103 |
| 6,098,137 A | 8/2000 | Goodrum et al. ........... 710/129 |
| 6,105,075 A | 8/2000 | Ghaffari ......................... 710/5 |
| 6,125,417 A | 9/2000 | Bailis et al. ................ 710/103 |
| 6,128,711 A | 10/2000 | Duncan et al. ............. 711/155 |
| 6,138,198 A | 10/2000 | Garnett et al. .............. 710/129 |
| 6,141,711 A * | 10/2000 | Shah et al. ................. 710/302 |
| 6,141,722 A | 10/2000 | Parsons ........................ 711/2 |
| 6,141,744 A | 10/2000 | Wing So ..................... 712/35 |
| 6,141,769 A | 10/2000 | Petivan et al. ................ 714/10 |
| 6,170,029 B1 * | 1/2001 | Kelley et al. ............... 710/302 |
| 6,232,676 B1 | 5/2001 | Kozyra et al. .............. 307/113 |
| 6,321,286 B1 * | 11/2001 | Goodrum et al. ........... 710/311 |
| 6,363,452 B1 * | 3/2002 | Lach ......................... 710/316 |
| 6,453,429 B1 * | 9/2002 | Sadana ........................ 714/43 |
| 6,484,227 B1 | 11/2002 | Mergard et al. ............... 711/1 |
| 6,487,623 B1 * | 11/2002 | Emerson et al. ............ 710/302 |
| 6,546,483 B1 | 4/2003 | Lai ............................... 713/1 |
| 6,598,106 B1 * | 7/2003 | Grieshaber et al. ......... 710/305 |
| 6,658,507 B1 * | 12/2003 | Chan .......................... 710/100 |
| 6,708,283 B1 * | 3/2004 | Nelvin et al. .................. 714/5 |
| 2002/0129303 A1 * | 9/2002 | Karppanen .................. 714/43 |
| 2002/0156954 A1 * | 10/2002 | Edwards ..................... 710/105 |

FOREIGN PATENT DOCUMENTS

| | | | | |
|---|---|---|---|---|
| EP | 0 428 330 A2 | 5/1991 | | |
| EP | 0 428 330 A3 | 5/1991 | ..................... 13/30 |
| EP | 0 406 759 A3 | 9/1991 | ..................... 12/56 |
| EP | 0 486 172 A1 | 5/1992 | ..................... 10/14 |
| EP | 0 534 675 B1 | 3/1993 | ...................... 7/14 |
| EP | 0 475 005 B1 | 11/1995 | |
| EP | 0 293 860 B1 | 2/1996 | |
| EP | 0 390 567 B1 | 6/1999 | |
| GB | 2 060 229 A2 | 4/1981 | |

* cited by examiner

METHODS AND APPARATUS FOR COMPUTER BUS ERROR TERMINATION

FIELD OF THE INVENTION

The present invention relates to computer bus systems, and more specifically, to methods and apparatus for avoiding bus faults when isolating bus-connected devices from the bus.

BACKGROUND OF THE INVENTION

A computer system is a highly-integrated set of components, which may include one or more Computer Processing Units (CPUs), Input/Output (I/O) systems, peripheral components and memory storage devices. Buses are used within the computer system as an interconnect mechanism to carry control messages, data, addresses and other information between components of the computer system. Recent graphics-oriented operating systems, such as Windows NT, include high bandwidth requirements for buses such that the buses need to be capable of moving large amounts of video and other data between computer components.

In any computer system, a fault can occur in a component of the system, either in hardware or software. A fault can occur due to the intricate nature of the software, which includes complex programming. Alternatively, the electromechanical devices which make up the hardware upon which the software runs can also fail due to a number of factors such as overheating, power supply problems and the like. When a failure occurs during a bus transaction, peripherals and other components interfaced with the bus, can become "wedged" or otherwise confused because the bus transaction has been suspended or left incomplete. Internal state machines waiting for certain signals to be asserted or de-asserted in accordance with expected protocol, in order to, for example, finalize the transaction may never receive such signals. This leads to errors in the operation of the bus ("bus faults"), or even failure of the other, non-faulty devices on the bus. Ultimately, these circumstances can lead to partial or total system failure and can result in costly downtime.

At present, when a failure occurs on a device interfaced with a bus, operations are suspended, and the computer is shut down and rebooted. Although this may be tolerable as an inconvenience in some environments, it is clearly not a desirable method for handling such failures in a computer system demanding high-reliability and availability. Such computer systems include those used in the operation and tracking of financial markets, the control and routing of Internet and telecommunications information, air traffic control, and other emergency applications. To accommodate current computer systems which are operating in such sensitive environments, a more reliable method and system for handling failures of devices interfaced with the bus is needed.

SUMMARY OF THE INVENTION

Accordingly, it is an object of the present invention to provide a process and system for use with a bus architecture within a fault-tolerant computer system to survive bus transaction errors and to allow operations on a bus to continue between the remaining devices after a failure occurs in a device interfaced with the bus.

In one aspect, the invention relates to an apparatus for isolating a device from a bus without interrupting system operation. The apparatus includes bus interface logic that monitors activity on the bus and generates a signal indicating the activity status of the bus, e.g., idle or busy. The apparatus also includes an isolation switch for each bus-connected device and isolation control logic that transmits an isolation switch control signal to the isolation switch to isolate the bus-connected device from the bus. The isolation control logic transmits the isolation switch control signal in response to an idle bus status signal and a received signal requesting the isolation of the device from the bus.

In one embodiment, the isolation control logic receives the device isolation signal from system software. In another embodiment, for a system using virtual memory addressing, the isolation control logic receives the device isolation signal from input/output virtual address (IOVA) error detector detecting bus transactions addressing an invalid memory location. In another embodiment, the isolation control logic receives the device isolation signal from protocol checker logic monitoring the validity of the protocol for each of the bus transactions. In yet another embodiment, the isolation control logic receives the device isolation signal from a hot-plug sensor element responsive to the physical removal of the device from its bus interface slot.

In another aspect, the invention relates to a process for isolating a bus-connected device from the bus, where the bus-connected device is participating in a bus transaction, in a system having a bus controlled by a bus controller and having at least one bus-connected device in communication with the bus via an isolation switch. The process includes the steps of receiving a signal identifying that a particular bus-connected device(s) must be isolated from the bus; receiving a bus status signal indicating the status of the bus; and transmitting an isolation switch control signal responsive to both the received device isolation signal and the received bus status signal. In one embodiment, the process further includes the step of isolating the identified bus-connected device from the bus responsive to the received bus-connected device isolation signal.

BRIEF DESCRIPTION OF THE DRAWINGS

The invention is pointed out with particularity in the appended claims. The drawings are not necessarily to scale, emphasis instead generally being placed upon illustrating the principles of the invention. Like reference characters in the respective drawing figures indicate corresponding parts. The advantages of the invention described above, as well as further advantages of the invention, may be better understood by reference to the description taken in conjunction with the accompanying drawings, in which:

DETAILED DESCRIPTION OF THE INVENTION

Figure 1:
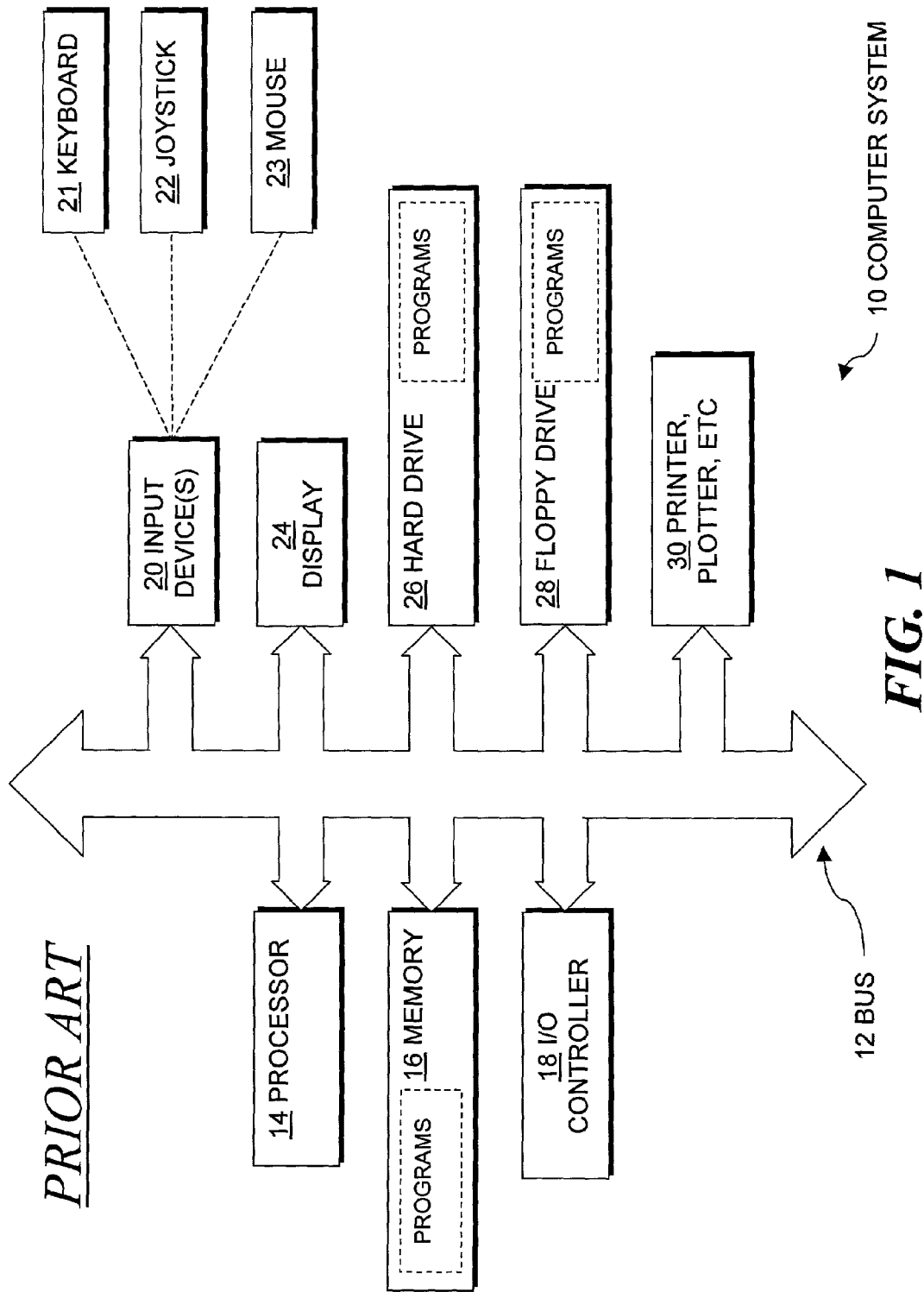
FIG. 1 is a block diagram of a prior art computer system.

Referring now to FIG. 1, a typical computer 10 includes a central processor 14, a main memory unit 16 for storing programs and/or data, an I/O controller 18, a display device 24, and an electrical communications, or system, bus 12 coupling these components to allow communication between these units. The memory 16 may include random access memory (RAM) and read only memory (ROM) chips. The computer 10 typically also has one or more input devices 20 such as a keyboard 21 (e.g., an alphanumeric keyboard and/or a musical keyboard), a mouse 23. In some embodiments, non-traditional input devices are provided such as a joystick 22, a trackball, a graphics tablet, or a touch-pad.

The computer system 10 typically also has a hard disk drive 26 and a floppy disk drive 28 for receiving floppy disks such as 3.5-inch disks. Other devices also can be part of the computer 10 including output devices 30 (e.g., printer or plotter) and/or optical disk drives for receiving and reading digital data on a Compact Disk (CD)-ROM. In the disclosed embodiment, one or more computer programs define the operational capabilities of the computer system 10. These programs can be loaded onto the hard drive 26 and/or into the memory 16 of the computer 10 via the floppy drive 28. Applications may be caused to run by double clicking a related icon displayed on the display device 24 using the mouse 23. In general, the controlling software program(s) and all of the data utilized by the program(s) are stored on one or more of the computer's storage mediums such as the hard drive 26, CD-ROM 30, etc.

The system bus 12 allows data to be transferred between the various units in the computer 10. For example, the processor 14 may retrieve program data from the memory 16 over the system bus 12. Various system busses 12 are standard in computer systems 10, such as the Video Electronics Standards Association Local Bus (VESA Local Bus), the Industry Standard Architecture (ISA) bus, the Extended Industry Standard Architecture (EISA) bus, the Micro Channel Architecture (MCA) bus, and the Peripheral Component Interconnect (PCI) bus. In some computer systems 10 multiple busses may be used to provide access to different units of the system. For example, a system 10 may use a PCI bus to connect a processor 14 to peripheral devices 30 and to concurrently connect the processor 14 to main memory 16 using a MCA bus. Other embodiments include a system bus 12 comprised of other bus architectures, or combination of bus architectures, such as an Accelerated Graphics Port (AGP) bus, a Small Computer System Interface (SCSI) bus, a Universal Serial Bus (USB), a Personal Computer Memory Card Industry Association (PCMCIA) bus, a NuBus, a TURBOchannel bus, a Multibus, a STD bus, or a Versa Module Europa (VME) bus.

In brief overview, a device 32 transfers information to another device 32, the central processor 14, or the memory 16 via the bus 12. Generally, the information is transferred through bus transactions that adhere to any one of a number of predetermined bus protocols, depending on the particular bus architecture. These bus architectures may be the standard bus architectures referred to in FIG. 1 or other non-standard, proprietary bus architectures. Bus protocols typically identify and define the physical structure of the bus 12 including the lines that make up the bus 12 and the parameters of those lines, such as voltage levels, and timing requirements. Examples of bus lines include discrete signals, clock signals, time-varying signals, signal returns, electrical power and ground. Bus protocols also typically identify the logical structure of the bus including predefined bus commands, arbitration schemes, and bus transactions. Examples of bus transactions include, but are not limited to, memory write and memory read operations, device write and device read operations, and configuration write and configuration read operations.

Figure 2:
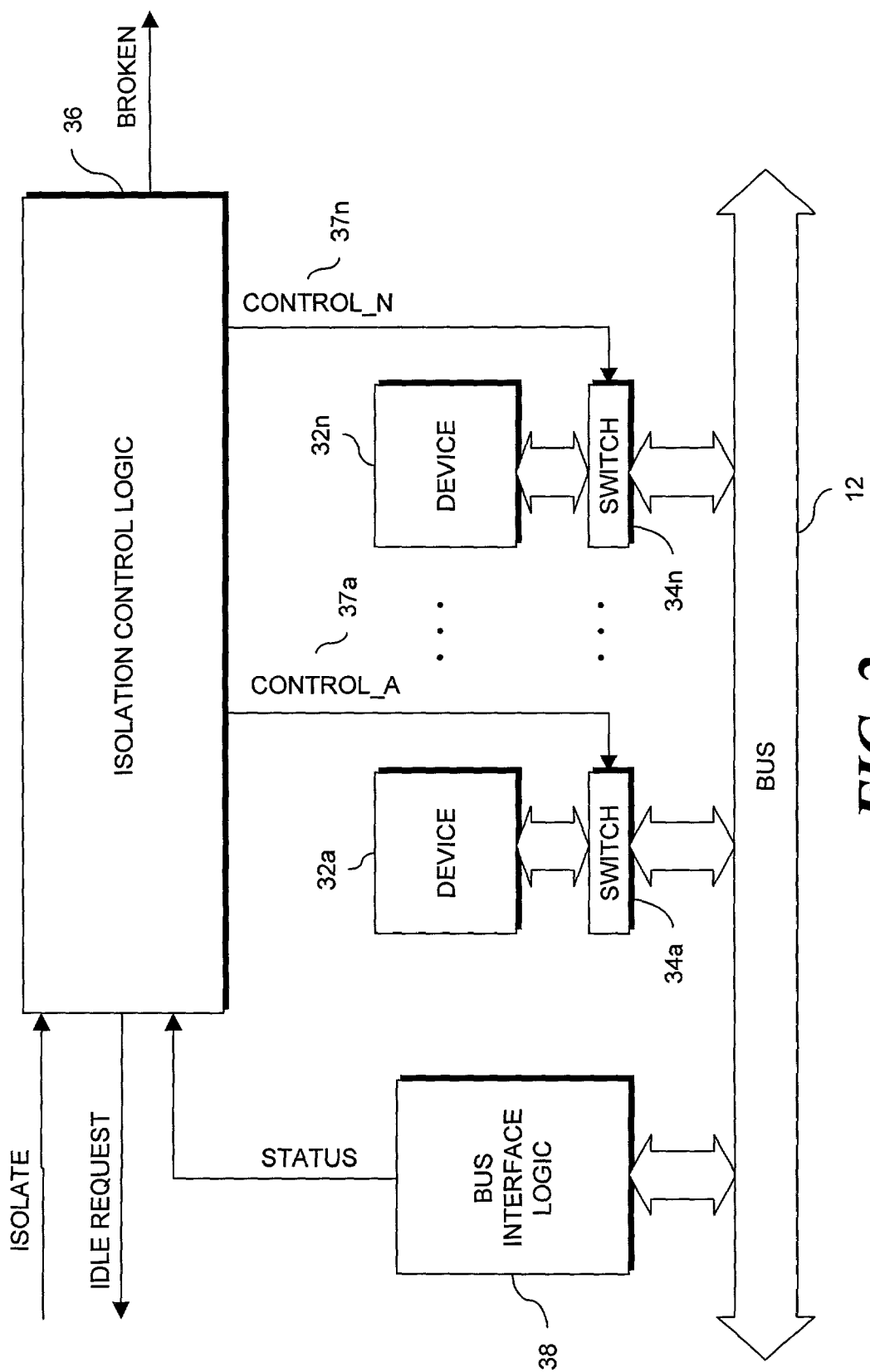
FIG. 2 is a block diagram of a bus architecture incorporating one embodiment of the invention.

Referring now to FIG. 2, one embodiment of a portion of a computer system 10 utilizing a bus architecture is shown that includes an electronic communications bus 12, isolation control logic 36 and bus interface logic 38. As shown in FIG. 2, the computer system 10 may include one or more devices 32a, . . . , 32n (generally 32) in communication with other elements of the computer system 10 through the bus 12. The devices 32 may be any device that communicates with the bus 12, including but not limited to peripheral devices, such as disks, keyboards, monitors, mice, printers, scanners, tape drives, microphones, speakers, and cameras. As shown in FIG. 2, each of the devices 32 communicates with the bus 12 through a respective isolation switch 34a, . . . , 34n (generally 34). The isolation switches 34 allow the devices 32 to be individually isolated from the bus 12.

The bus interface logic 38 monitors the status of one or more of the signals of the bus 12 and generates a bus status signal (STATUS) indicating the status of the signal activity of the bus 12, e.g., idle or busy. In one embodiment, the bus interface logic 38 monitors the operational state of the bus 12 and generates the STATUS signal indicating the state of the bus 12. For example, in a PCI bus, the bus interface logic 38 may monitor the IRDY#, TRDY# and FRAME# signals.

The isolation control logic 36 receives the STATUS signal and also receives a signal (ISOLATE) indicating that one or more devices 32 may need to be isolated from the bus 12. The ISOLATE signal may identify the device(s) 32 to be isolated from the bus 12 or, alternatively, the ISOLATE signal may indicate the occurrence of a fault requiring additional actions to identify which device(s) 32 may need to be isolated from the bus 12. In response to receiving the STATUS signal and the ISOLATE signal, the isolation control logic 36 generates an isolation switch control signal, CONTROL_A, . . . , CONTROL_N (generally CONTROL). The isolation switch control logic 36 transmits the CONTROL signal to the isolation switch(es) 34 associated with the identified device(s) 32 to be isolated from the bus 12. The isolation switch(es) 34 associated with the identified device(s) 32 receives the CONTROL signal and, in response, isolates the device(s) 32 from the bus 12.

Each isolation switch 34 typically includes a number of individual contacts, or "poles," one contact for each of the signal lines forming the bus interface. In one embodiment, the isolation switch 34 is an electronically controllable switch such as a field effect transistor (FET) switch having individual FET devices, one FET device for each of the signal lines forming the bus interface. In an alternative embodiment, the isolation switch 34 is an electromechanical switch, such as an electrical relay. In yet another embodiment, the isolation switch 34 is an opto-isolation switch, where interconnections of each of the electrical lines forming the interface are accomplished through electrical-to-optical conversions.

Figure 3:
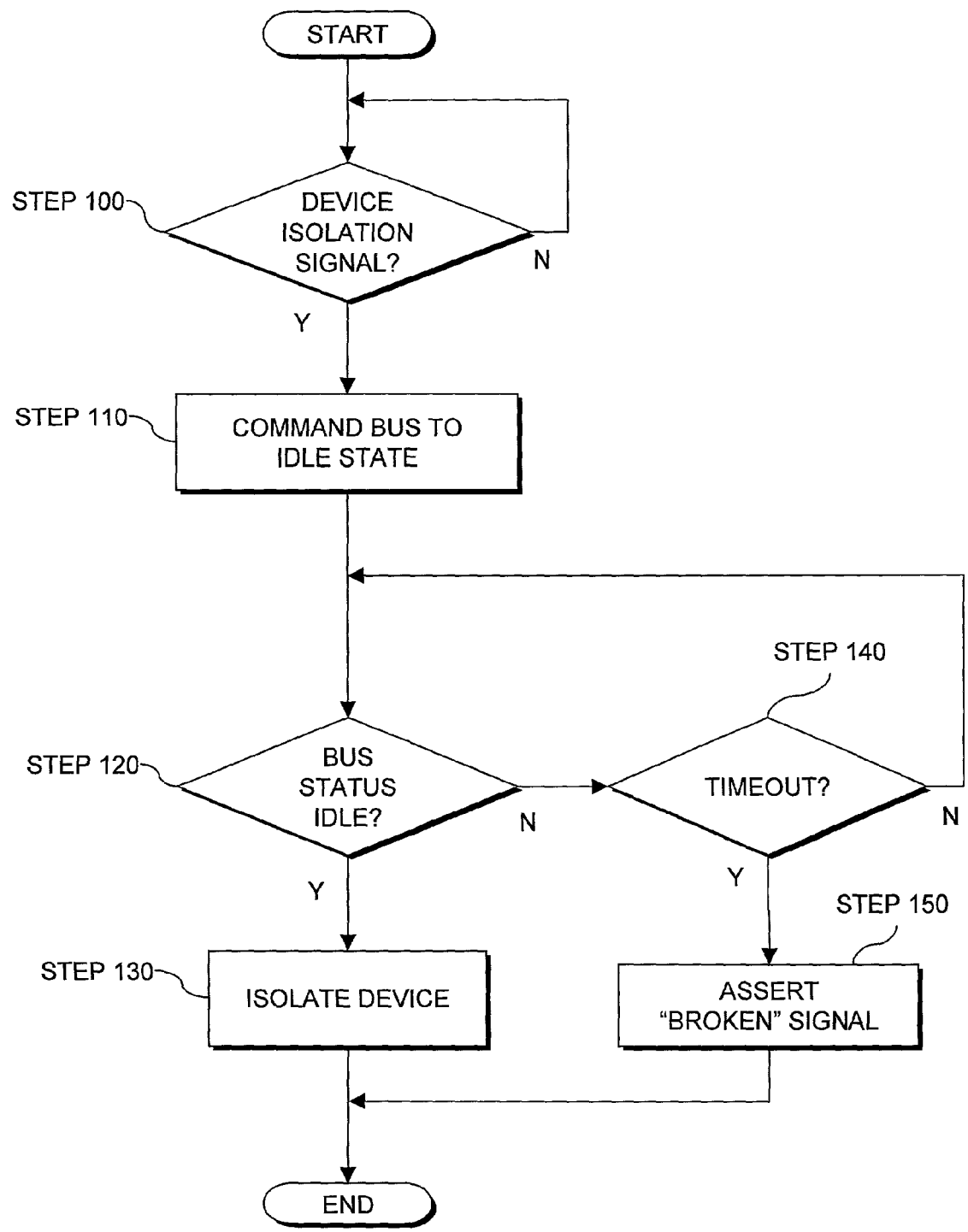
FIG. 3 is a flow diagram of one embodiment of the steps utilized by one embodiment of the invention to isolate a device.

Referring now to FIG. 3, the steps to be taken to isolate a device 32 from a bus 12 are shown where the device 32 is interconnected to the bus 12 and communicating with other elements of a computer system 10 through the bus 12. In brief overview, the isolation control logic 36 determines that a device 32 should be isolated from the bus 12, commands the bus 12 to an idle state and isolates the device 32 from the bus 12 (steps 100, 110 and 130).

In greater detail, the isolation control logic 36 monitors its inputs for signals indicating that one or more devices 32 should be isolated from the bus 12 (step 100). For example, when the master of a bus transaction aborts the transaction because the intended target does not respond, the target may be faulty and should be isolated from the bus 12 to avoid propagating faulty information into other parts of the computer system 10. Generally, a device 32 should not be removed from the bus 12 if the device 32 is participating in a bus transaction because suspending or leaving the bus transaction incomplete may subsequently disrupt normal operation of the bus 12. One way to ensure that the device 32 is not participating in a bus transaction is to observe that no devices 32 are participating in a bus transaction. Another way to ensure that the device 32 is not participating in a bus transaction is to identify which device 32 are participating in a bus transaction at any one time, then to compare the device 32 to be isolated from the bus 12 with the identified device(s) 32 participating in the bus transaction. If the device(s) 32 is not participating in the bus transaction it may be isolated from the bus immediately, otherwise, the device (s) 32 should not be isolated until it is no longer participating in a bus transaction.

For embodiments including a bus controller, the bus 12 may be placed in an idle state through a command issued to the bus controller by the isolation control logic 36 responsive to the isolation control logic 36 receiving the ISOLATE signal (step 110). For embodiments including a bus arbiter, the bus arbiter may respond to the transmitted idle command by revoking access rights to the bus 12 for the devices 32 connected to the bus 12. Before the isolation control logic 36 can isolate the device 32 from the bus 12, the isolation control logic 36 must be notified that the device 32 is not participating in a bus transaction (step 120). In one embodiment the isolation control logic 36 receives the STATUS signal from the bus interface logic 38 indicating to the isolation switch control logic 36 the activity status of the bus 12. When the STATUS signal indicates that the bus 12 is idle, the isolation control logic 36 may transmit the CONTROL signal to the appropriate isolation switch 34. The isolation switch 34, in turn, responds to the CONTROL signal by isolating the device 32 from the bus 12 (step 130). If isolation control logic 36 cannot confirm within a predetermined time period that the device 32 to be isolated from the bus 12 is not participating in a transaction, such as when the received STATUS signal does not indicate that the bus 12 is idle within a predetermined time period (step 140) after the ISOLATE signal is received at the isolation control logic 36, the isolation control logic 36 may transmit a signal (BROKEN) indicating that the bus 12 is faulty (step 150).

Figure 4:
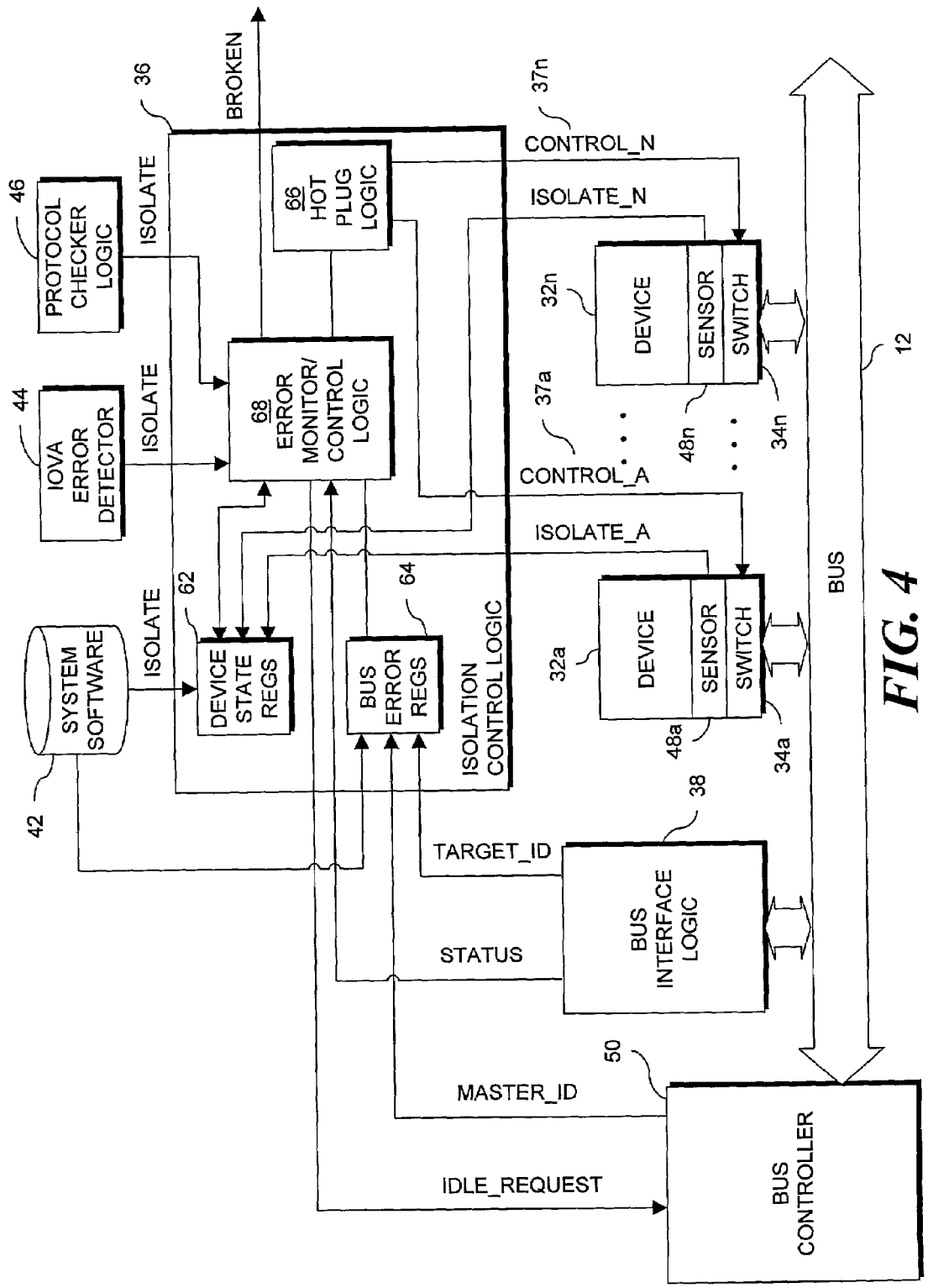
FIG. 4 is a more detailed block diagram of a bus architecture incorporating one embodiment of the invention shown in FIG. 1.

FIG. 4 depicts an embodiment of the invention in which the bus 12 is controlled by a bus controller 50. The bus controller 50 may include an arbiter for controlling shared access to the bus 12 among the several devices 32 connected to the bus 12. Generally, the bus controller 50 receives requests for bus access from devices 32 and grants bus access in an orderly manner, restricting control of the bus 12 to one device 32 at a time, that is, only one device 32 may be the master of a transaction on the bus 12 at any one time.

In some embodiments the bus controller 50 determines the identity of the device 32 that is driving data onto the bus 12 and provides a resulting bus-master identity output signal (MASTER_ID) to the isolation control logic 36. For example, where the bus 12 is controlled by a bus controller 50, the bus controller 50 determines the bus-master identity by retaining the identity of the device 32 granted access to the bus 12. In another embodiment where the bus includes bus grant signals, a system element, such as the bus interface logic 38, tracks the current master of a bus transaction by monitoring the bus grant signals. In yet another embodiment where the bus includes dedicated line(s) used to coordinate bus access (e.g., dedicated interconnects such as conductive leads or etches) a system element, such as the bus interface logic 38, tracks the current master of a bus transaction by monitoring the bus grant line(s). Other embodiments include a system element, such as the bus interface logic 38, or system software monitoring and interpreting bus arbitration activity to identify the master of a bus transaction. Likewise, the bus interface logic 38 may determine the identity of the one or more target devices 32 to which the bus transaction is directed. In some embodiments the bus interface logic 38 identifies and transmits the resulting bus-target identity, or identities, as an output signal (TARGET_ID). In some embodiments the bus interface logic 38 determines the bus-target identity by inspecting the contents of the bus transaction to identify the address of the target device(s) 32. Where dedicated memory address ranges are identified with, or mapped to particular devices 32, the bus interface logic 38 may determine the identity of the target by determining the device 32 associated with the address of a bus transaction. Determination of the identity of the device may be achieved by inspecting the bus transaction address against a device-memory association table. In some embodiments, the device-memory association table is setup by system software. In other embodiments, the device-memory association table is predetermined according to the standards of a particular bus. For example, in a PCI bus, where a bus transaction is an I/O write to an I/O device 32, the bus interface logic 38 inspects the address of the I/O write bus transaction. The target identity is determined by inspecting the I/O address and comparing it with the previously set up register containing that device(s) 32 I/O address range. In yet other embodiments the system 10 includes interconnects (e.g., transmission lines) to each of the devices 32 carrying signals indicating that a particular device 32 is the current target, the bus interface logic 38 may determine the identity of the target device 32 by monitoring the signals.

In one embodiment, the isolation control logic 36 receives the one or more isolation signals, ISOLATE_A, . . . , ISOLATE_N, (generally ISOLATE), from system software 42 or any one of a number of error detectors. In one embodiment, these error detectors include an input/output virtual address (IOVA) error detector 44, protocol checker logic 46, and a number of "hot-plug" sensors 48a, . . . 48n (generally 48), with one hot-plug sensor being associated with each of the devices 32 interconnected to the bus 12. System software 42 and each of the error detectors 44, 46, and 48 may generate in response to a system event, the ISOLATE signal. It should be understood that the different logic elements 36, 38, 66, 68 and error detectors 44, 46, shown as independent elements within FIG. 2 and FIG. 4, may be combined within a single logic element, combined in variations within one or more logic elements. One or more of the logic elements 36, 38, 66, 68 and error detectors 44, 46 may also be implemented within software.

In one embodiment and in more detail, the isolation control logic 36 includes a bank of device state registers, 62a, 62b, . . . , 62n (generally 62), with one register being associated with a respective bus-connected device 32. Each of the device state registers 62 stores for the respective device 32 its related state information, e.g., operational or broken. The isolation control logic 36 also contains bus error registers 64 for storing information related to the condition of the bus 12 at any one time. In one embodiment, the bus error registers 64 store information related to the condition of the bus at the time of a reported error. Also included in the isolation control logic 36 is hot-plug logic 66 receiving an isolate device signal and transmitting the CONTROL signal to the appropriate isolation switch(es) 34 to isolate the identified faulty device(s) 32 from the bus as previously described. The isolation control logic 36 also includes error monitor and control logic 68 in communication with the device state registers 62, the bus error registers 64, the hot-plug logic 66, the bus interface logic 38, the IOVA error detector 44, and the protocol checker 46.

The devices 32 to be isolated may be identified from the contents of the state registers 62. In one embodiment, each of the device state registers 62 includes a first bit indicating that the identified device 32 should be isolated due to a hardware-reported error, Each of the device state registers 62 may also include a second bit indicating that the identified device 32 should be isolated due to a software-reported error. The hardware-reported error bit in each of the state registers 62 may be controlled by the respective sensor 48 or by the error monitor and control logic 68. Where the hardware-reported error bit is controlled by the error monitor and control logic 68, the error monitor and control logic 68 first receives an ISOLATE signal from one of the hardware error detectors 44, 46 then determines which device(s) 32 related to the detected error should be isolated. The software-reported error bit in each of the state registers 62 may be controlled directly by system software 42.

In more detail, the bus error registers 64 store status information such as status information relating to the device 32, and to other devices also connected to the bus 12. In one embodiment bus error registers 64 are used to capture and store detailed system bus information at the time an error is identified. One register may contain bus information including information relating to identification of a target and a master, address, data, or whether the system bus 12 is in an idle or wait state. Another register may contain information identifying the bus error type and contains all the error bits provided for by the system bus 12, including any information provided by the particular system bus protocol used. Another register may contain information identifying the address and the particular bus command of the most recent transaction on the bus address phase. Yet another register may contain all the control signals on the system bus 12 at the time the error occurred. And yet another register may contain the data on the system bus 12 data signal lines at the time of the error. In one particular embodiment of the present invention for a PCI system bus 12, Table 1 identifies exemplary error categories that software may report to the bus error registers 64.

In operation, one of the error detectors 44, 46, 48, or system software 42, determines that a device, or devices, 32 must be isolated from the bus 12. The error detectors 44, 46, 48, or system software 42, generate the ISOLATE signal output. The isolation control logic 36 receives the ISOLATE signal indicating that a device, or devices, 32 must be isolated from the bus 12 (step 100) and, in turn, generates the IDLE REQUEST signal output causing the bus 12 to transition to an idle state (step 110). In one embodiment, the isolation control logic 36 transmits a signal (IDLE REQUEST) directed to the bus controller 50. The bus controller 50 receives the IDLE REQUEST signal and, in response, revokes all bus grants such that none of the devices 32 control the bus 12. This should cause the bus 12 to transition to the idle state. In another embodiment particularly well suited for bus architectures without a defined idle state, the isolation control logic 36 is provided with a priority that is higher than all other devices 32. In response to receiving the ISOLATE signal, the isolation control logic 36 transmits the IDLE REQUEST signal output in the form of a request for access to the bus 12. In response to the request from the isolation control logic 36, the bus controller 50 grants access to the bus 12 to the isolation control logic 36 over requests from all other devices 32. The isolation control logic 36 assumes the role of bus master and maintains the bus 12 in the idle state by not initiating any bus transactions and by maintaining access to the bus 12.

The ISOLATE signal is provided by one or more error detectors that may include the IOVA error detector 44, the protocol checker logic 46 and hot-plug sensors 48. IOVA error detection useful in connection with the present invention is disclosed in co-pending U.S. application Ser. No. 09/789,051 filed on Feb. 20, 2001 the contents of which are incorporated herein by reference in its entirety. In one embodiment, the IOVA error detector 44 detects errors in a system 10 using virtual memory addressing resulting from incorrect memory addresses within bus transactions involving system memory 16. In one embodiment, the IOVA error detector 44 monitors the memory address portion of each bus transaction. The IOVA error detector 44 identifies whether the master or the target address of a bus transaction corresponds correctly with a valid memory address. Where the IOVA error detector 44 detects that a particular bus transaction is addressing an invalid virtual address, the IOVA error detector 44 transmits the ISOLATE signal to the isolation control logic 36 initiating the isolation of the device 32 from the bus 12 as previously described.

In one embodiment, and in more detail, the protocol checker logic 46 is a state machine that tracks operation of the system bus 12. The protocol checker logic 46 checks all transactions on the bus for protocol violations. When the protocol checker logic 46 detects a protocol violation, the protocol checker logic 46 transmits the ISOLATE signal to the isolation control logic 36 initiating the isolation of the appropriate device 32 from the bus 12 as previously described.

TABLE 1

PCI Bus Errors

| Error | Description |
| --- | --- |
| Master Abort | Master has terminated a transaction (e.g., when no target responds). |
| Target Abort | Target has terminated a transaction (e.g., when the target is only willing to complete the current data phase and no more). |
| IRDY Time-out | Master was unable to complete a transaction within a predefined time period. (For example, the PCI specification defines master latency requirements, such as a master initial and subsequent latency value of 8 clock cycles.) |
| TRDY Time-out | Target was unable to complete a transaction within a predefined time period. (For example, the PCI specification defines target latency requirements, such as a target initial value of 16 clocks (32 for host bridges) and a target subsequent latency value is 8 clock cycles.) |

TABLE 1-continued

PCI Bus Errors

| Error | Description |
| --- | --- |
| Address Parity Error | Detected parity error in the address portion of a bus transaction. (For example, where a bus master generates an "even" parity for the address phase of a bus transaction, an address parity error is detected where a bus device detects an "odd" parity for the same address phase.) |
| Data Parity Error during write (posted or delayed) | Detected parity error in the data portion of a bus-write transaction. (For example, where a bus master generates an "even" parity for the data phase of a bus-write transaction, a data parity error is detected where a bus device detects an "odd" parity for the data phase of the same bus-write transaction.) |
| Data Parity Error during read | Detected parity error in the data portion of a bus-read transaction. (For example, where a bus target generates an "even" parity for the data phase of a bus-read transaction, a data parity error is detected where a bus device detects and "odd" parity for the data phase of the same bus-read transaction.) |
| Command Error | Detected invalid command in the command portion of a bus transaction. (For example, where only memory commands are allowed, all other commands are errors including reserved commands.) |
| Lock Error | Detected error when a bus device, other than a bridge, assert a lock signal (e.g., PCI LOCK# for a PCI bus). |
| Peer-to-Peer Error | Detected error when a bus device 32 attempts to address another bus device 32 other than the controller 50. |
| Grant-to-Frame Time-out | Error when a bus device continues to request bus access, but fails to assert a bus signal within a predetermined time period of receiving a grant. (For example, the error indicates that a bus device continued to request bus access, but failed to assert FRAME# for a PCI bus within 12 clock cycles of receiving a grant.) |
| Detected SERR | Detected system error (e.g., address or data parity errors where the result will be catastrophic and subsequent transactions to the bus device may fail). |
| Detected PERR | Detected data parity error during a bus transaction, except in some instances such as where the bus transaction is a special cycle. |
| Retry Count | Detected error when a transaction is initiated and not completed within a predetermined number of retry attempts. |
| Discard Time-out | Master has issues a delayed transaction in a split-transaction bus, that was not responded to within a predetermined period of time. |
| Master Latency Time-out | Device remains on the bus longer than a predetermined time period, e.g., twice the maximum master latency timer value. |

Protocol violations include physical protocol violations, such as invalid commands; sequential protocol violations, such as receiving a bus transaction responsive to a requesting bus transaction where the requesting transaction had not been previously issued; and logical protocol violations, such as a system memory 16 receiving a read or write command directed to an I/O device. Protocol checker logic 46 useful in connection with the present invention is disclosed in co-pending U.S. application Ser. No.: 09/796,155, filed on Feb. 28, 2001 the contents of which are incorporated herein by reference in its entirety. In one embodiment, the protocol checker logic 46 is implemented with hardware. Other embodiments are possible where the protocol checker logic 46 is implemented in software or a combination of hardware and software.

In one embodiment, a hot-plug sensor 48 is provided to sense the physical removal of the device 32 from its bus interface slot. When the device 32 is extracted from its bus interface slot the device 32 must be isolated from the bus as described herein to avoid causing a bus fault. The sensor hot-plug 48 senses that the device 32 is being physically removed from its bus interface slot. In response to sensing the physical removal of the device 32, the hot-plug sensor 48 transmits the ISOLATE signal to the isolation control logic 36. The isolation control logic 36 response to the ISOLATE signal by commanding the isolation of the device 32 from the bus 12 as previously described.

In one embodiment, the hot-plug sensor 48 is a mechanical device, such as a switch or a lever, sensing the physical removal of the devices 32 from its respective bus interface slot. Hot-plug sensing useful in connection with the present invention is disclosed in co-pending Unites States patent application Ser. No. 09/548,529 filed on Apr. 13, 2000, the contents of which are incorporated herein by reference in its entirety. In another embodiment, the hot-plug sensor 48 is an electrical sensor, sensing an electrical stimuli, such as a current or voltage associated with one of the pins of the physical bus interface. In one embodiment, as the device 32 is removed from the interface, the current/voltage-sensing pin is removed from its socket causing the current/voltage to change, thus sensing the removal of the device 32 from its bus interface slot. In yet another embodiment, the hot-plug sensor 48 is an optical sensor sensing the physical removal of the device 32 from the physical bus interface through optical stimuli.

The isolation control logic 36 receives the STATUS signal from the bus interface logic 38 and continuously monitors the STATUS signal input to determine when the bus 12 is idle (step 120). When the STATUS signal indicates that the bus 12 is idle, having already received the ISOLATE signal, the isolation control logic 36 determines which of the devices 32 should be isolated from the bus 12. The isolation control logic 36, responsive to determining which device, or devices, 32 should be isolated from the bus 12, generates an isolation switch control command(s) to isolate the identified device(s) 32 from the bus 12 (step 130).

In operation, the system software 42 writes particular values into the contents of the device state registers 62 identifying that a particular device(s) 32 should be isolated. The error monitor/control logic 68 reads the hardware and software-reported error bits for each of the device state registers 62 to determine if a hardware or software device error has been reported. If the error monitor/control logic 68 reads an error condition from the first and second bits of any of the device status registers 62 the error monitor/control logic 68 transmits the IDLE_REQUEST signal to the bus controller 50 requesting that the bus be transitioned to the idle state. The error monitor/control logic 68 monitor the STATUS input signal transmitted from the bus interface logic 38 reporting the idle status of the bus 12. When the error monitor/control logic 68 receives the STATUS signal indicating that the bus 12 is idle within a predefined time, the period measured from the time that the related ISOLATE signal was received, the error monitor/control logic 68 transmits a device isolation signal to the hot plug logic 66, identifying the particular device(es) 32 to be isolated from the bus. The hot plug logic 66, in turn, generates the CONTROL signal(s) directed to the identified isolation switch(es) 34 to isolate the identified device(s) 32 from the bus. If the error monitor/control receives the ISOLATE signal from the IOVA error detector 44, or the protocol checker logic 46, the error monitor/control logic 68 determines the device(s) 32 to be isolated and similarly transmits the IDLE_REQUEST signal and monitors the received STATUS signal, transmitting the device isolation signal to the hot-plug logic 66 requesting that the identified device(s) 32 be isolated from the bus 12. Likewise, if the error monitor/control logic 68 reads error bits from the bus error registers 64 indicating the occurrence of an error on the bus 12, the error monitor/control logic 68 isolates the appropriate device(s) 32 as previously described.

In some instances, the isolation control logic 36 does not receive the STATUS signal within a predefined time period, and, in turn, generates the BROKEN signal indicating a faulty bus (step 150). In one embodiment, the time-out error is reported as a protocol violation by the protocol-checker logic 46. In another embodiment the isolation control logic 36 includes a timing circuit that measures elapsed time from the time when the isolation control logic 36 receives the isolate device signal, until the time that the isolation control logic provides the isolation switch control signal. As previously described referring to FIG. 2, in one embodiment, the isolation control logic 36 does not provide an isolation switch control signal to the isolation switch 34 until the isolation switch control logic receives both a device isolation signal from the system monitor 19 and a bus status signal from the bus interface logic 38 indicating that the bus is idle. In one embodiment, when the isolation control logic 36 receives the device isolation signal and the bus status signal indicates that the bus is not idle, the timer initiates the measurement of elapsed time. In one embodiment, when the bus status signal indicates that the bus is idle, the timer stops measuring elapsed time and the isolation control logic 36 provides the isolation switch control signal commanding the isolation switch 34 to isolate the device 32 from the bus 12. In one embodiment, when the isolation control logic 36 has received a device isolation signal without receiving a bus idle signal within the predetermined time period, but the isolation control logic 36 does not receive the bus idle signal within a predefined timeout threshold, the isolation control logic provides an output signal directed towards the bus controller 40.

In yet another embodiment, in response to receiving the device isolation signal and observing that the measured elapsed time has surpassed the predefined timeout threshold, the output provided by the isolation control logic 36 and directed toward the bus controller 50 is a bus controller reset signal to the input of the bus controller 50. In response to the bus controller reset signal, the bus controller 50 performs a reset operation, bringing the bus 12 to an operational and idle state, ready to continue supporting bus transactions. The bus reset operation clears the bus 12 when the bus 12 has become unusable, or "wedged," a condition where the device 32 participating in a bus transaction has failed in a manner that does not allow the device 32 to complete the bus transaction then in process.

EXAMPLE

In an example of one embodiment of the present invention, a device 32 is isolated in response to an error occurring in a PCI bus transaction. Information is communicated between devices 32 connected to a PCI bus 12 through bus transactions consisting, generally, of an address phase and a data phase. A bus-connected device 32 functions as a bus master by requesting access to the bus 12 from the bus controller. After receiving a grant of access to the bus 12, the bus master initiates one or more transactions addressed to one or more target devices 32. A PCI bus includes a number of parallel lines generally grouped into address and data, interface control, error reporting, arbitration and system signal groups. In particular, among other signals, the interface control signals include a cycle frame signal (FRAME#) indicating the beginning and duration of a bus access, an initiator ready signal (IRDY#) indicating the initiating agent's (bus master's) ability to complete the current data phase of the transaction, and a target ready signal (TRDY#) indicating the target agent's (target device's) ability to complete the current data phase of the transaction.

In this example, the error results from a target ready signal (TRDY#) time-out. That is, the device 32 functioning as the bus master asserts the FRAME# signal indicating the beginning of a bus transaction. The bus master drives the address lines with the address of the bus transaction and the command lines with the particular command (e.g., I/O device write or read) during the address phase of the bus transaction. Under normal operation, the bus master asserts the IRDY# signal and the device 32 functioning as the target asserts the TRDY# signal indicating that the master and target are ready to continue with the data phase(s) and complete the bus transaction. In this example, the target does not assert the TRDY# signal within a predetermined time period (e.g., eight clock cycles). The protocol checker logic 46 monitoring the PCI bus control lines, detects the TRDY# timeout and in response provides an ISOLATE signal output. The isolation control logic 36 receives the ISOLATE signal, determines which device(s) 32 should be isolated in response to the detected protocol violation and controls the appropriate isolation switch(es) 34 to isolate the corresponding device(s) 32.

In more detail, the error monitor and control logic 68 receives the ISOLATE signal from the protocol checker logic 46 indicating that a protocol violation has been detected. In response to the detected error, the error monitor and control logic 68 sets a bit, or series of bits, in the error registers 64, at substantially the same time that the error was detected causing the storage of certain information relating to the current bus transaction associated with the detected protocol violation. The error monitor and control logic 68 determines the faulty peripheral device(s) 32 associated with the protocol violation and sets the hardware error bit in the corresponding device state register 62 associated with the identified device indicating that the device(s) 32 is broken.

In this example, the bus interface logic 38 includes target identification logic identifying the target(s) of each bus transaction and providing the output TARGET_ID signal identifying those target(s). In other embodiments, the target identification logic may be included in the isolation control logic 36. The target identification logic of the bus interface logic 38 determines the target(s) of the bus transaction by inspecting the contents of the bus transaction. Specifically, for the PCI-bus example, the target detection logic reads the portions of the bus transaction associated with the address (es) of the target(s). From the address(es), the target detection logic determines target(s) identity by comparing the target memory location with a stored association of memory ranges with device(s) 32, the association established during an initial configuration of the PCI bus 12.

The error monitor and control logic 68 determining from the hardware error bit of the device state register 62 that a particular device(s) 32 should be isolated, sends a signal to the hot plug logic 66 identifying the particular device(s) 32 to be isolated from the bus 12. The hot plug logic 66, in turn, provides an output control signal(s) 37 to the appropriate isolation switch(es) 34. The isolation switch(es) 34 respond to the control signal by driving the electrical interconnections to the bus 12 of the faulty device(s) 32, to a high-impedance state, thus isolating the device 32 from the bus 12. At substantially the same time that the faulty device 32 is isolated from the system bus 12, the hot plug logic 66 notifies the isolation control logic 36 that the faulty device 32 has been isolated. Thus, a faulty peripheral device 32 connected to the system bus 12 failed, was identified, isolated from the system bus 12 and the system bus 12 was returned to an idle state without substantial interruption to normal system 10 processing.

Having shown the preferred embodiments, one skilled in the art will realize that many variations are possible within the scope and spirit of the claimed invention. It is therefor the intention to limit the invention only by the scope of the claims.

What is claimed is:

1. An apparatus for isolating, in response to a device isolation signal and a bus idle status signal, a device from a bus without interrupting system operation, the apparatus comprising:
   bus interface logic in communication with the bus, the bus interface logic generating a signal indicating the idle status of the bus;
   an isolation switch in communication with the bus;
   protocol checker logic configured to monitor the validity of bus transactions and to generate a device isolation control signal on a device isolation control line; and
   isolation control logic in communication with the bus interface logic, the device isolation control line, and the isolation switch,
   wherein the isolation control logic transmits an isolation switch control signal to the isolation switch in response to the generated bus idle status signal from the bus interface logic and the received device isolation signal on the device isolation control line.

2. The apparatus of claim 1 wherein the bus interface logic comprises a state machine.

3. The apparatus of claim 1 wherein the bus interface logic comprises combinatorial logic.

4. The apparatus of claim 1 wherein the bus interface logic monitors all bus transactions.

5. The apparatus of claim 1 wherein the bus idle status signal generated by the bus interface logic indicates that the bus is idle.

6. The apparatus of claim 1 wherein the isolation control logic comprises combinatorial logic.

7. The apparatus of claim 1 wherein the isolation control logic receives the device isolation signal on the device isolation control line from logic monitoring the operational status of the system.

8. The apparatus of claim 1 wherein the isolation control logic receives the device isolation signal on the device isolation control line from a hot-plug logic element.

9. The apparatus of claim 8 wherein the hot-plug logic element generates the device isolation signal on the device isolation control line responsive to the physical removal of the device from its slot.

10. The apparatus of claim 1 wherein the device is isolated from the bus at substantially the same time that the protocol violation was detected.

11. The apparatus of claim 10 wherein the protocol checker logic generates the device isolation signal on the device isolation control line responsive to a detected protocol violation.

12. The apparatus of claim 1 wherein the bus transactions are communicated on the bus in relation to clock cycles, and wherein the device is isolated from the bus within one clock cycle of the detected protocol violation.

13. The apparatus of claim 12 wherein the protocol checker logic generates the device isolation signal on the device isolation control line during the same clock cycle as the detected protocol violation.

14. The apparatus of claim 1 wherein the isolation control logic comprises a timer measuring elapsed time.

15. The apparatus of claim 14 wherein the timer measures elapsed time relative to a system event.

16. The apparatus of claim 15 wherein a timeout signal is generated in response to the elapsed time exceeding a predetermined threshold.

17. The apparatus of claim 16 wherein the isolation control logic transmits a bus reset signal responsive to receiving both the device isolation signal on the device isolation control line and the timeout signal from the timer.

18. In a system having a bus controlled by a bus controller, a device isolation control line, and having at least one bus device in communication with the bus via an isolation switch, a method for isolating the bus device from the bus, the method comprising the steps:
   (a) detecting a protocol violation on the bus and generating an isolation control signal on a device isolation control line in response to the detected protocol violation;
   (b) receiving the isolation control signal on the device isolation control line, the signal identifying a bus device to be isolated, the bus device performing a bus transaction;
   (c) receiving a bus idle status signal;
   (d) transmitting an isolation switch control signal responsive to both the received device isolation signal and the received bus idle status signal; and
   (e) isolating the device from the bus.

19. The method of claim 18 further comprising the step of isolating the identified bus device from the bus responsive to the received bus device isolation signal.

20. The method of claim 18 further comprising the step of inhibiting bus access.

21. The method of claim 18 further comprising the steps of:
   receiving a timeout signal; and
   resetting the bus responsive to receiving both the timeout signal and the bus status idle signal indicating that the bus is not idle.

22. The method of claim 18 wherein the device is isolated from the bus at substantially the same time that the protocol violation was detected.

23. An apparatus for isolating a device from a bus without interrupting system operation, the apparatus comprising:
   means for receiving a signal identifying a bus device to be isolated, the identified bus device performing a bus transaction;
   means for receiving a bus idle status signal;
   means for detecting a protocol violation on the bus and sending an isolation control signal to the means for receiving a signal identifying a bus device to be isolated in response to the detected protocol violation; and
   means for transmitting an isolation switch control signal responsive to both the received bus device isolation signal and the received bus idle status signal.

* * * * *